(12) United States Patent
Webb

(10) Patent No.: US 6,979,803 B1
(45) Date of Patent: Dec. 27, 2005

(54) TACO SHELL HEATING APPARATUS

(76) Inventor: Jesse Webb, 14255 Regina Dr., Rancho Cucamonga, CA (US) 91739

( * ) Notice: Subject to any disclaimer, the term of this patent is extended or adjusted under 35 U.S.C. 154(b) by 102 days.

(21) Appl. No.: 10/789,826

(22) Filed: Feb. 27, 2004

(51) Int. Cl.$^7$ ............................ A47J 37/00; A47J 37/08
(52) U.S. Cl. .................. 219/405; 219/386; 219/411; 99/332; 99/334; 99/391; 99/385
(58) Field of Search ................................ 219/386, 392, 219/394, 405, 411, 412, 414; 99/332, 334, 99/327, 391, 393

(56) References Cited

U.S. PATENT DOCUMENTS

| 2,134,474 | A | * | 10/1938 | Gillespie | .................... | 219/405 |
|---|---|---|---|---|---|---|
| 4,533,558 | A | * | 8/1985 | Ogle | ............................ | 99/391 |
| 4,554,865 | A | | 11/1985 | Caridis et al. | | |
| 4,974,502 | A | | 12/1990 | Murdock | | |
| 5,309,826 | A | * | 5/1994 | Ortiz | ............................ | 99/391 |
| 5,390,588 | A | * | 2/1995 | Krasznai et al. | ............. | 219/405 |
| 5,628,245 | A | | 5/1997 | Baze | | |
| 6,116,150 | A | * | 9/2000 | Greenfield, Jr. | ............... | 99/332 |
| 6,123,012 | A | * | 9/2000 | Hardin et al. | .................. | 99/326 |
| 6,205,910 | B1 | * | 3/2001 | Vaughn | ........................ | 99/391 |
| 6,546,844 | B1 | * | 4/2003 | Trevino | ........................ | 99/327 |

* cited by examiner

Primary Examiner—Joseph Pelham

(57) ABSTRACT

A taco shell heating apparatus for providing a fast, convenient, oil free way to heat taco shells. The taco shell heating apparatus includes a housing with four slots positioned through a top wall of the housing. Each one of the four slots is for selectively receiving a taco shell. A heating assembly is positioned within the housing. The heating assembly toasts the taco shell when the taco shell is received within the housing. The heating assembly further comprises a plurality of heat reflecting elements, at least one heating element, a timing assembly, and at least one extraction device.

10 Claims, 3 Drawing Sheets

TACO SHELL HEATING APPARATUS

BACKGROUND OF THE INVENTION

1. Field of the Invention

The present invention relates to taco shell cooking devices and more particularly pertains to a new taco shell heating apparatus for providing an efficient oil-free way to quickly heat taco shells.

2. Description of the Prior Art

The use of taco shell cooking devices is known in the prior art. Illustrative examples include: U.S. Pat. No. 4,554,865; U.S. Pat. No. 4,974,502; and U.S. Pat. No. 5,628,245.

While these devices fulfill their respective, particular objectives and requirements, the need remains for an apparatus that provides a convenient oil-free means for heating taco shells.

SUMMARY OF THE INVENTION

Perhaps no other form of Mexican cuisine is as universally enjoyed as the taco. Perfect for a snack or even an entrée, a taco is essentially a "sandwich" consisting of a folded corn tortilla, filled with various ingredients such as beef, pork, chicken, chorizo sausage, tomatoes, lettuce, cheese, onion, guacamole, refried beans and salsa. The tortilla shells that serve as the backbone of this delectable food item are offered in soft, pliable versions, but many prefer the harder, crispier varieties that combine a satisfying texture with more authentically Mexican taste. To achieve this crunchy consistency when making their own tacos, consumers will either bake the shells in a conventional oven, or turn to the more common method of frying them in flavorful oils. While baking and frying produce a better tasting shell, such preparations are not without drawbacks. Preheating an oven and then waiting for the appliance to reach a desired heating level for toasting shells can be a time consuming process. Although frying is faster, shell preparers risk being splattered with extremely hot popping grease when immersing shells into the heated oil. In addition, frying shells in oil infuses them with fatty greases, which can turn a delicious taco into an unhealthy delicacy.

The Taco shell heating apparatus provides a practical alternative to heating taco shells via frying or baking. Simply stated, this product is modified standard toaster that is specially designed to heat multiple taco shells in a safe, expedient manner. Similar in appearance and function to a standard toaster, the Taco shell heating apparatus is generally square in shape and could be manufactured of heavy duty aluminum or lightweight, yet durable plastic material. A slightly enlarged version of the standard household toaster, this product would measure approximately eleven inches (11") in length, seven and one half inches (7½") in height, and ten and one half inches (10½") in width. Positioned at the top of the Taco shell heating apparatus are four rectangular slots, sized appropriately to toast four taco shells at a time. Measuring seven inches (7") in length and one and one half inches (1½") in width, each slot would contain a spring loaded tray designed to easily dispense the cooked shells. Positioned within each shell slot are two sheets of mica, each which is generously wrapped in nichrome wire and cleverly configured in a distinctive "U" shape to sufficiently toast a shell on a bottom as well as the sides. Designed to quickly heat and brown the shells, this nichrome wire serves as an "infrared radiator" and is activated via two simple sliding handles located on the side panel of the unit. The Taco shell heating apparatus would operate on AC or DC electricity would be connected to a standard power outlet.

Use of the Taco shell heating apparatus would be very simple and straightforward. Upon purchasing a unit, the user would simply plug the Taco shell heating apparatus into any standard power outlet. Next, the user would imply insert a taco shell into one, two or all of the unit's four slots and gently push down on the corresponding handles, located on the side of the toaster. As the handles were pushed downward, the nichrome wire would be activated, warming and browning the shells. Once the shells had finished browning, the spring loaded tray would release and the cooked shells would "pop up" out of the toaster. Removing the shells, the user would load each shell with their favorite ingredients and enjoy a selection of deliciously warm and crispy tacos!

The Taco shell heating apparatus would offer consumers several significant benefits and advantages. Foremost, this cleverly designed product invention would provide taco aficionados with simple, healthier way to prepare warm and crunchy hard taco shells. Eliminating the need to immerse shells in hot oils to attain a crispy fried taste, the Taco shell heating apparatus would allow users to avoid the mess and burning risks that can result from frying. In addition, health conscious consumers will certainly appreciate that this handy device would produce light, crispy tortilla that is free of saturated fats. Extremely easy to use, the Taco shell heating apparatus would operate in a manner similar to a conventional household toaster. By simply placing a shell into each of the four slots, children as well as adults can easily prepare a savory, crispy taco shell in a matter of minutes. While the Taco shell heating apparatus was primarily conceived with household users in mind, restaurants that offer tacos on their menus would find this product invaluable for convenient and mess-free taco preparation.

To this end, the present invention generally comprises a housing with four slots positioned through a top wall of the housing. Each one of the four slots is for selectively receiving a taco shell. A heating assembly is positioned within the housing. The heating assembly toasts the taco shell when the taco shell is received within the housing. The heating assembly further comprises a plurality of heat reflecting elements, at least one heating element, a timing assembly, and at least one extraction device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
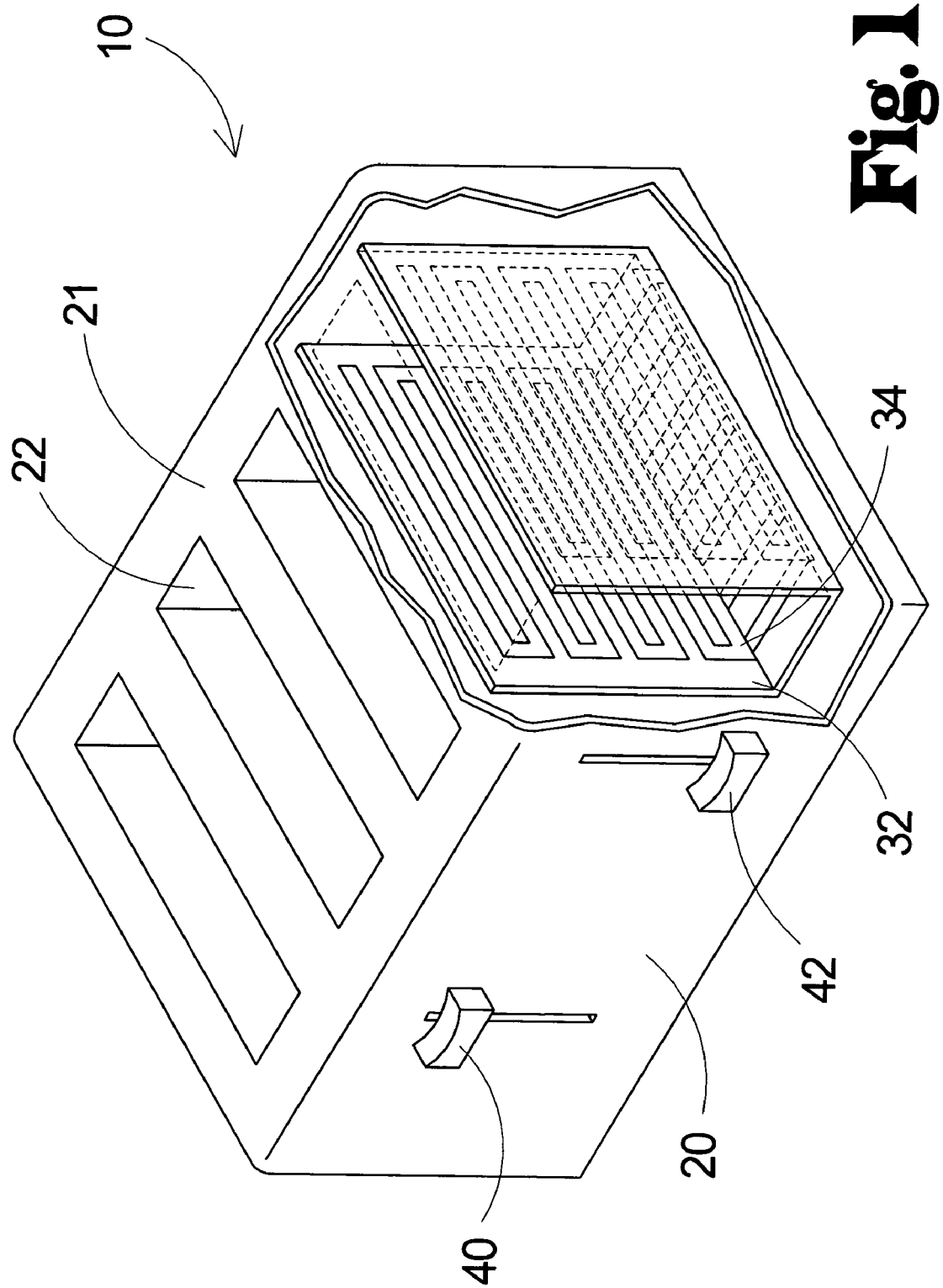
FIG. 1 is a schematic perspective view of a new taco shell heating apparatus according to the present invention.
Figure 2:
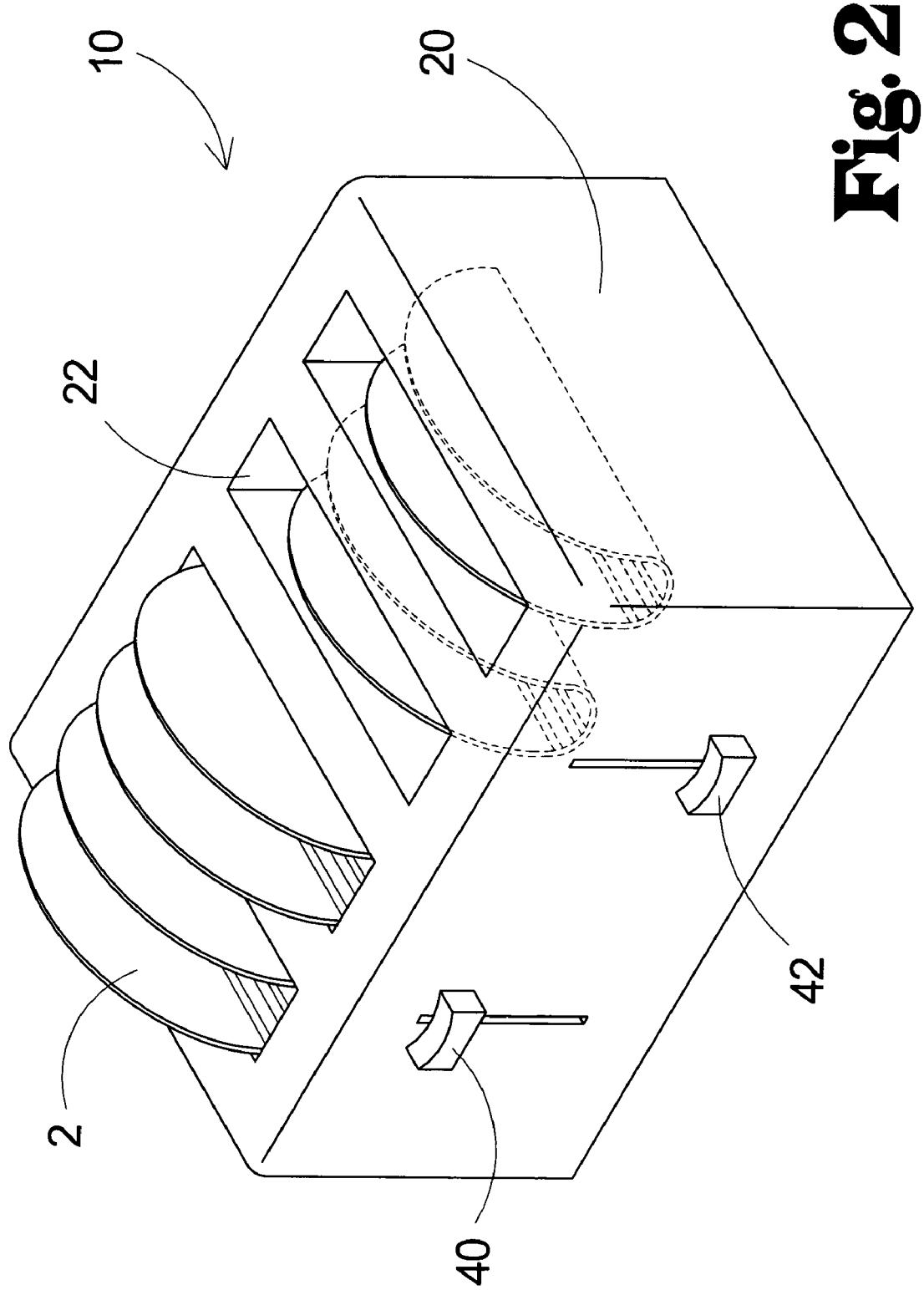
FIG. 2 is a schematic perspective view of the present invention in use.
Figure 3:
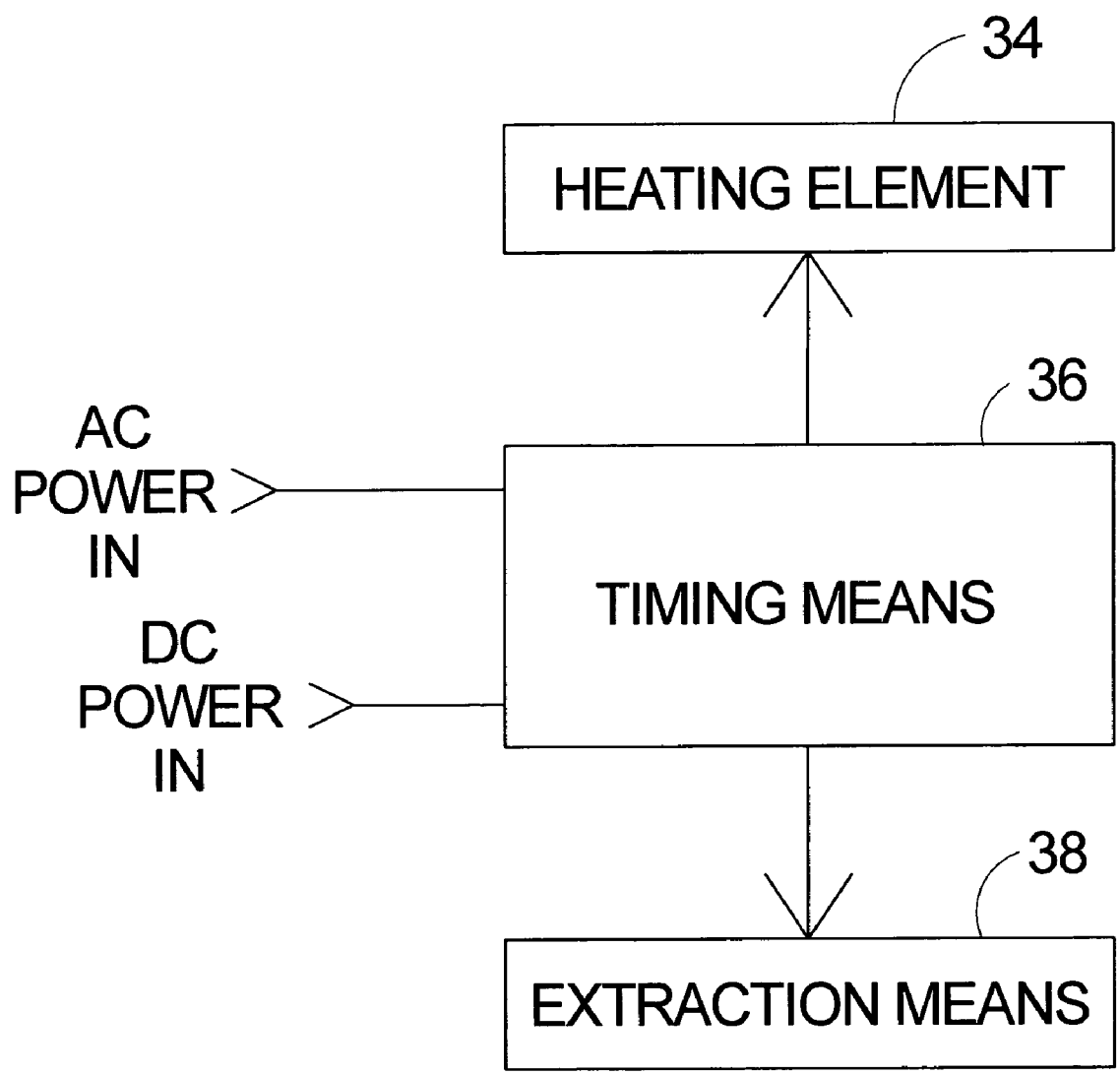
FIG. 3 is a schematic functional interconnect diagram of the present invention.

With reference now to the drawings, and in particular to FIGS. 1 through 3 thereof, a new taco shell heating apparatus embodying the principles and concepts of the present invention and generally designated by the reference numeral 10 will be described.

As best illustrated in FIGS. 1 through 3, the taco shell heating apparatus 10 generally comprises a housing 20, and a heating assembly 30.

The housing 20 preferably has four slots 22 positioned through a top wall 21 of the housing 20. Each one of the four slots 22 is for selectively receiving a taco shell 2.

The heating assembly 30 is positioned within the housing 20. the heating assembly 30 toasts the taco shell 2 when the taco shell 2 is received within the housing 20.

In a preferred embodiment, the heating assembly 30 further comprises a plurality of heat reflecting elements 32, at least one heating element 34, a timing means 36, and at least one extraction means 38.

In at least one embodiment, five heat reflective elements 32 are associated with the four slots 22. Each one of the five heat reflective elements 32 is positioned on an associated side of one of the four slots 22.

The heating element 34 is positioned along each of the heat reflective elements 32 and between each of heat reflective elements 32 along a bottom of the housing 20. One continuous heating element may be used, or a series of heating elements may be used and electrically coupled together.

The timing means 36 is operationally coupled to the heating element 34 to control a duration of heating. The timing means 36 may be a conventional spring timer, an electronic timer, or any other suitable device.

The extraction means 38 is used for facilitating removal of the taco shell 2 from the four slots 22. The extraction means may include a first handle 40 for selectively elevating the taco shell out of a first pair of the four slots, and a second handle 42 for selectively elevating the taco shell out of a second pair of the four slots. Preferably, each one of the five heat reflective elements comprises a sheet of mica, and the heating element comprises nichrome wire.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A taco shell heating apparatus comprising:
   a housing having at least one slot positioned through a perimeter wall of said housing, said at least one slot selectively receiving a taco shell;
   a heating assembly positioned within said housing, said heating assembly toasting the taco shell when the taco shell is received within the housing;
   a pair of heat reflective elements associated with said at least one slot, said pair of heat reflective elements being dispersed on either side of said slot;
   a heating element positioned along each of said pair of heat reflective elements and between said pair of heat reflective elements along a bottom of said housing;
   a timing means operationally coupled to said heating element to control a duration of heating; and
   and a extraction means for facilitating removal of said taco shell from said at least one slot.

2. The apparatus of claim 1, wherein said beating assembly being adapted for utilizing conventional household ac power.

3. The apparatus of claim 1, wherein said heating assembly being adapted for utilizing dc power.

4. The apparatus of claim 1, wherein said housing having an overall length of approximately eleven inches, an overall width of approximately ten and one half inches, and an overall height of approximately seven and one half inches.

5. The apparatus of claim 1, wherein each one of said five heat reflective elements comprises a sheet of mica.

6. The apparatus of claim 1, wherein said heating element comprises nichrome wire.

7. The apparatus of claim 1, wherein said extraction means farther comprises:
   a first handle for selectively elevating the taco shell out of a first pair of said four slots; and
   a second handle for selectively elevating the taco shell out of a second pair of said four slots.

8. The apparatus of claim 1, wherein said housing having an overall length of approximately eleven inches, an overall width of approximately ten and one half inches, and an overall height of approximately seven and one half inches.

9. A taco shell heating apparatus comprising:
   a housing having four slots positioned through a top wall of said housing, each one of said four slots being for selectively receiving a taco shell;
   a heating assembly positioned within said housing, said heating assembly toasting the taco shell when the taco shell is received within the housing;
   five heat reflective elements associated with said four slots, each one of said five heat reflective elements being positioned on an associated side of one of said four slots;
   a heating element positioned along each of said heat reflective elements and between each of heat reflective elements along a bottom of said housing;
   a timing means operationally coupled to said heating element to, control a duration of heating;
   and a extraction means for facilitating removal of said taco shell from said four slots.

10. A taco shell heating apparatus comprising:
    a housing having four slots positioned through a top wall of said housing, each one of said four slots being for selectively receiving a taco shell;
    a heating assembly positioned within said housing, said heating assembly toasting the taco shell when the taco shell is received within the housing;
    wherein said heating assembly further comprises:
    five beat reflective elements associated with said four slots, each one of said five heat reflective elements being positioned on an associated side of one of said four slots;

a heating element positioned along each of said heat reflective elements and between each of heat reflective elements along a bottom of said housing;

a timing means operationally coupled to said heating element to control a duration of heating;

and a extraction means for facilitating removal of said taco shell from said four slots;

wherein each one of said five heat reflective elements comprises a sheet of mica;

wherein said heating element comprises nichrome wire;

wherein said extraction means further comprises:

a first handle for selectively elevating the taco shell out of a first pair of said four slots;

a second handle for selectively elevating the taco shell out of a second pair of said four slots; and said housing having an overall length of approximately eleven inches, an overall width of approximately ten and one half inches, and an overall height of approximately seven and one half inches.

\* \* \* \* \*